US009017817B2

(12) United States Patent
Wano et al.

(10) Patent No.: US 9,017,817 B2
(45) Date of Patent: Apr. 28, 2015

(54) METHOD FOR PRODUCING LAMINATED POROUS SHEET COMPRISING POLYTETRAFLUOROETHYLENE AND CARBON PARTICLES

(75) Inventors: Takashi Wano, Osaka (JP); Hiroyuki Higuchi, Osaka (JP); Masayoshi Kawabe, Osaka (JP); Ryoichi Matsushima, Osaka (JP); Yoshinori Yamamoto, Aichi (JP); Koichiro Yamashita, Aichi (JP)

(73) Assignee: Nitto Denko Corporation, Osaka (JP)

( * ) Notice: Subject to any disclaimer, the term of this patent is extended or adjusted under 35 U.S.C. 154(b) by 214 days.

(21) Appl. No.: 12/989,151

(22) PCT Filed: Apr. 28, 2009

(86) PCT No.: PCT/JP2009/058326
§ 371 (c)(1),
(2), (4) Date: Oct. 22, 2010

(87) PCT Pub. No.: WO2009/133874
PCT Pub. Date: Nov. 5, 2009

(65) Prior Publication Data
US 2011/0039091 A1 Feb. 17, 2011

(30) Foreign Application Priority Data
Apr. 30, 2008 (JP) .................. 2008-119278

(51) Int. Cl.
| | |
|---|---|
| B32B 5/32 | (2006.01) |
| B32B 27/00 | (2006.01) |
| C08J 9/00 | (2006.01) |
| B32B 27/18 | (2006.01) |
| B32B 27/28 | (2006.01) |
| C08J 9/28 | (2006.01) |
| B29C 43/00 | (2006.01) |
| B29C 43/26 | (2006.01) |
| B29C 43/30 | (2006.01) |
| B29C 43/46 | (2006.01) |
| B29K 27/18 | (2006.01) |
| B29K 105/04 | (2006.01) |

(52) U.S. Cl.
CPC .......... C08J 9/0066 (2013.01); B32B 2305/026 (2013.01); B32B 2307/304 (2013.01); B29C 43/00 (2013.01); B29C 43/003 (2013.01); B29C 43/26 (2013.01); B29C 43/305 (2013.01); B29C 43/46 (2013.01); B29K 2027/18 (2013.01); B29K 2105/04 (2013.01); B29K 2995/0005 (2013.01); B29K 2995/001 (2013.01); B32B 27/18 (2013.01); B32B 27/28 (2013.01); C08J 9/283 (2013.01); C08J 2201/0502 (2013.01); C08J 2327/18 (2013.01)

(58) Field of Classification Search
None
See application file for complete search history.

(56) References Cited

U.S. PATENT DOCUMENTS

| | | | | |
|---|---|---|---|---|
| 2,685,707 | A * | 8/1954 | Llewellyn et al. | 264/127 |
| 3,890,417 | A * | 6/1975 | Vallance | 264/49 |
| 3,930,979 | A * | 1/1976 | Vallance | 204/252 |
| 4,049,589 | A * | 9/1977 | Sakane | 521/64 |
| 4,129,470 | A | 12/1978 | Homsy | |
| 4,500,597 | A | 2/1985 | Yazaki et al. | |
| 4,551,220 | A * | 11/1985 | Oda et al. | 204/294 |
| 4,563,488 | A | 1/1986 | Minami et al. | |
| 4,985,296 | A | 1/1991 | Mortimer | |
| 5,158,680 | A * | 10/1992 | Kawai et al. | 210/321.61 |
| 5,300,366 | A * | 4/1994 | Nakamaru et al. | 428/549 |
| 5,738,936 | A | 4/1998 | Hanrahan | |
| 5,945,217 | A | 8/1999 | Hanrahan | |
| 6,103,172 | A | 8/2000 | Newman et al. | |
| 6,831,031 | B2 | 12/2004 | Ishihara | |
| 2005/0100728 | A1 | 5/2005 | Ristic-Lehmann et al. | |
| 2010/0012884 | A1 | 1/2010 | Nakamichi et al. | |
| 2010/0084156 | A1 | 4/2010 | Yasukawa et al. | |
| 2011/0223427 | A1 | 9/2011 | Wano et al. | |

FOREIGN PATENT DOCUMENTS

| | | |
|---|---|---|
| CN | 101140915 | 3/2008 |
| EP | 0856550 | 8/1998 |

(Continued)

OTHER PUBLICATIONS

Lewis, Richard J., "aluminum oxide." in: Hawley's Condensed Chemical Dictionary [online]. (15th ed. Hoboken, NJ, John Wiley & Sons, Inc., 2007) [retrieved on Dec. 27, 2012]. Retrieved from Knovel using Internet, <URL:http://www.knovel.com> p. 49.

(Continued)

*Primary Examiner* — Christina Johnson
*Assistant Examiner* — David Schmerfeld
(74) *Attorney, Agent, or Firm* — Hamre, Schumann, Mueller & Larson, P.C.

(57) ABSTRACT

The method for producing the porous sheet of the present invention includes the steps of (I) preparing a plurality of sheet materials that contain polytetrafluoroethylene and carbon particles and (II) stacking the plurality of sheet materials over one another and rolling the stacked sheet materials. In the method for producing the porous sheet of the present invention, step (I) and step (II) may be repeated alternately. Further, as the sheet materials to be used in the production method of the present invention, a base sheet obtained by forming a mixture containing polytetrafluoroethylene and carbon particles into sheet form also can be used, or a laminated sheet obtained by stacking a plurality of base sheets over one another and rolling them also can be used, for example.

6 Claims, No Drawings

(56) References Cited

FOREIGN PATENT DOCUMENTS

| | | |
|---|---|---|
| GB | 1081046 A * | 8/1967 |
| JP | 50-079563 | 6/1975 |
| JP | 53-085865 | 7/1978 |
| JP | 55-108425 | 8/1980 |
| JP | 59-221902 | 12/1984 |
| JP | 61-008102 | 1/1986 |
| JP | 63-046524 | 9/1988 |
| JP | 3-008248 B2 | 2/1991 |
| JP | 3-212987 | 9/1991 |
| JP | 5-025668 B2 | 4/1993 |
| JP | 5-154928 | 6/1993 |
| JP | 2709371 B2 | 10/1997 |
| JP | 10/219013 | 8/1998 |
| JP | 2003-060134 | 2/2003 |
| JP | 2004-051772 | 2/2004 |
| JP | 2005-228955 | 8/2005 |
| JP | 2007-044994 | 2/2007 |
| JP | 2008-060527 | 3/2008 |
| JP | 2008-078380 | 4/2008 |
| JP | 2008-150595 | 7/2008 |
| JP | 2008-208159 | 9/2008 |
| WO | WO 9944957 A1 * | 9/1999 |
| WO | WO 2005/063864 | 7/2005 |
| WO | WO 2008/035682 | 3/2008 |
| WO | 2008/084512 | 7/2008 |

OTHER PUBLICATIONS

Roussel, M.D., et al., The Use of Calcium Carbonate in Polyolefins Offers Significant Improvement in Productivity [online]. 2005 PLACE conference, Sep. 27-29, 2005, Las Vegas, NV [retrieved on Feb. 1, 2014]. Retrieved from the Internet http://www.tappi.org/content/enewsletters/eplace/2006/06-3Rousselv1.pdf.

Peixi Wu & Zuyu Wang, "Manual on Production Process of Plastic", Chemical Industry Press, Feb. 1991, p. 152—with English translation.

* cited by examiner

METHOD FOR PRODUCING LAMINATED POROUS SHEET COMPRISING POLYTETRAFLUOROETHYLENE AND CARBON PARTICLES

TECHNICAL FIELD

The present invention relates to a porous sheet and a method for producing the porous sheet, and a heat insulating sheet.

BACKGROUND ART

Heat insulators are applied to various products, such as precision instruments whose functions are significantly affected by temperature changes, home appliances (e.g. refrigerator), and walls and ceiling of a clean room. Conventionally, polymer foams, such as urethane foam, and glass wool are used as a heat insulator, for example. These materials are not only excellent in heat insulating properties but also lightweight and inexpensive, and therefore are used as a heat insulator in a wide range of applications. Further, a fiber reinforced plastic heat insulator formed by impregnating woven fabric or nonwoven fabric with a matrix resin (see Patent Literature 1) has been proposed as a high-strength heat insulator.

However, these heat insulators have a problem of generation of static electricity. To deal with this, heat insulators capable of preventing generation of static electricity have been proposed, such as a heat insulator formed of heat insulating layers with a metal plate interposed therebetween, and a heat insulator coated with an antistatic agent (see Patent Literature 2 and Patent Literature 3), for example. However, in the case of the heat insulator formed of heat insulating layers with a metal plate interposed therebetween, a bonding process is necessary for interposing the metal plate therebetween, and the bonding strength between the layers needs to be enhanced in addition. For these reasons, there has been a problem of an increase in the number of production processes. On the other hand, the heat insulator that uses an antistatic agent has a problem of an increase in the number of production processes since a coating process is necessary for applying the antistatic agent. Furthermore, there is an additional problem of the antistatic performance deterioration with time.

Citation List

Patent Literature 1: JP 2709371 B2
Patent Literature 2: JP 3-8248 B
Patent Literature 3: JP 5-25668 B

SUMMARY OF INVENTION

Technical Problem

Thus, conventionally, it has been difficult to provide a heat insulator capable of preventing generation of static electricity using a simple and convenient method.

It is therefore an object of the present invention to provide a sheet that is available as a heat insulator and capable of preventing generation of static electricity, and has sufficient heat insulating properties.

Solution to Problem

The method for producing the porous sheet of the present invention includes the steps of: (I) preparing a plurality of sheet materials that contain polytetrafluoroethylene (hereinafter, referred to as PTFE) and carbon particles; and (II) stacking the plurality of sheet materials over one another and rolling them.

The porous sheet of the present invention contains PTFE and carbon particles, and has a thermal conductivity in the thickness direction of at least 0.05 W/mK but not more than 0.1 W/mK and a volume resistivity in the thickness direction of at least 0.5 Ω·cm but not more than 2 Ω·cm.

The present invention further provides a heat insulating sheet produced by using the above-mentioned porous sheet of the present invention or a porous sheet to be obtained by the above-mentioned production method of the porous sheet of the present invention.

Advantageous Effects of Invention

According to the method for producing the porous sheet of the present invention, a porous sheet having low thermal conductivity and high electrical conductivity can be obtained. Further, the porous sheet of the present invention has sufficient heat insulating properties and high electrical conductivity. Accordingly, the present invention makes it possible to provide, with a simple and convenient method, a porous sheet that is available as a heat insulator and capable of preventing generation of static electricity and has sufficient heat insulating properties.

DESCRIPTION OF EMBODIMENTS

Hereinafter, the embodiments of the present invention are described. It should be noted that the following descriptions are not intended to limit the present invention.

The method for producing the porous sheet of this embodiment includes the steps of: (I) preparing a plurality of sheet materials that contain PTFE and carbon particles; and (II) stacking the plurality of sheet materials over one another and rolling the stacked sheet materials.

An example of step (I) is described.

First, an example of the sheet materials to be prepared in step (I) is described. PTFE fine powder, carbon particles and a forming aid are mixed to produce a mixture in paste form. Desirably, they are mixed under conditions such that PTFE can be prevented from becoming fibrous as much as possible. Specifically, it is desirable to mix them without kneading under conditions in which the rotation rate is decreased and the mixing time is shortened. By mixing them in this way, the processing of sheet materials that contain PTFE as a matrix can be facilitated. Carbon particles are not particularly limited as long as they can be supported by the PTFE matrix without falling and can give sufficient electrical conductivity to the porous sheet to be obtained. However, the carbon particles desirably have a particle size of 20 to 60 nm. It should be noted that the particle size herein means a value to be obtained by a method in which arbitrary 10 sites of the carbon particles are observed to measure the particle size of 10 particles in each site (100 particles in total) using an SEM (Scanning Electron Microscope), and thereafter the mean value is calculated. Examples of the carbon particles that can be used include carbon black. The addition amount of the carbon particles, for example, is 60 to 90 wt %. As a forming aid, saturated hydrocarbons such as dodecane and decane can be used, for example. The addition amount of the forming aid, for example, is 1 to 1.4 times (weight ratio) with respect to the solid content. Such a mixture is extruded and rolled into sheet form, and thus obtained base sheet can be used as a sheet material of the present invention (the first example of the sheet material). The thus obtained sheet materials each have a thickness, for example, of 0.5 to 10 mm.

Further, as another example of the sheet materials to be prepared in step (I), there can be mentioned a laminated sheet (the second example of the sheet material) obtained by stacking a plurality of the above-mentioned base sheets over one another and rolling them. The number of the layers in the laminated sheet is not particularly limited, and can be determined appropriately in consideration of the number of constituent layers of the porous sheet (the number of layers that form the porous sheet) intended to be produced.

Thus, the sheet-materials can be prepared.

Next, an example of step (II) is described.

In step (II), the plurality of sheet materials prepared in step (I) are stacked over one another and then rolled. Specifically, the plurality of sheet materials prepared in step (I) are stacked, and the stacked product is rolled to form a laminated sheet. As mentioned above, the sheet material may be the above-mentioned base sheet (the first example of the sheet material), or may be a laminated sheet (the second example of the sheet material) obtained by stacking a plurality of the base sheets over one another and rolling the stacked sheets. The number of the sheet materials to be stacked over one another in step (II) is not particularly limited. For example, about 2 to 6 sheet materials can be stacked. Desirably, the sheet materials are stacked and rolled one on one, so that high strength can be achieved.

In the method for producing the porous sheet of this embodiment, step (I) and step (II) may be repeated alternately. A specific example of this case is described below.

First, a plurality of base sheets (e.g., 2 to 6 sheets) are prepared (step (I)). Next, the plurality of base sheets are stacked, and the stacked product is rolled to obtain a laminated sheet (first laminated sheet) (step (II)). A plurality of first laminated sheets (e.g., 2 to 6 sheets) as obtained above are prepared so that the first laminated sheets are used as the sheet materials in step (I). Next, the plurality of the first laminated sheets (e.g., 2 to 6 sheets) are stacked, and the stacked product is rolled to obtain a laminated sheet (second laminated sheet) (step (II)). Furthermore, a plurality of second laminated sheets (e.g., 2 to 6 sheets) as obtained above are prepared, and the second laminated sheets are used as the sheet materials in step (I). Next, the plurality of second laminated sheets (e.g., 2 to 6 sheets) are stacked, and the stacked product is rolled to obtain a laminated sheet (third laminated sheet) (step (II)). In this way, step (I) and step (II) are repeated alternately until the intended number of the constituent layers of the porous sheet can be achieved. In the embodiment described above, the laminated sheets each having the same number of layers (the first laminated sheets, or the second laminated sheets, for example) are stacked and rolled. However, laminated sheets with the number of layers different from one another also may be stacked and rolled.

When step (II) is repeated, the rolling direction is desirably changed. For example, at the time of rolling to obtain the second laminated sheet, the rolling direction may be changed by 90 degrees from the rolling direction that has been employed to obtain the first laminated sheet. By rolling with changing the rolling direction in this way, the network of PTFE extends in every direction, thereby allowing the sheet strength to be improved and the carbon particles to be fixed firmly to the PTFE matrix.

When the number of constituent layers of the porous sheet is expressed in terms of the total number of the base sheets included in the porous sheet, the number of constituent layers can be, for example, 100 to 800 layers. In order to improve the sheet strength, the number of layers is desirably 100 layers or more. Meanwhile, in order to obtain a sheet with a reduced thickness (e.g., 1 mm or less), the number of layers is desirably 800 layers or less. The more the number of constituent layers, the more the strength of the sheet to be obtained can be enhanced.

At an early stage of rolling (at a stage where the total number of base sheets to be included is small), the strength is low and therefore the sheet can hardly withstand rolling at high magnification. However, while repeating the stacking and rolling of the sheet materials, the upper limit of the rolling magnification is raised, so that the sheet strength can be improved and the carbon particles can be attached firmly to the PTFE matrix. Further, the structure of the laminated (the number of constituent layers) also has a relation to the heat insulating properties or compression resistance of the sheet to be obtained. Accordingly, the number of constituent layers is preferably 200 to 600 layers in order to obtain a sheet with sufficient heat insulating properties and compression resistance.

Finally, a sheet with a thickness of about 0.5 to 2 mm is produced, and thereafter the forming aid is heated and removed. Thus, the porous sheet of the present invention can be obtained.

According to the production method of this embodiment, a porous sheet having a thermal conductivity in the thickness direction of at least 0.05 W/mK but not more than 0.1 W/mK and a volume resistivity in the thickness direction of at least 0.5 $\Omega$·cm but not more than 2 $\Omega$·cm can be produced. Further, the production method of this embodiment allows a porous sheet having a porosity of 70 to 80 vol % to be produced.

Furthermore, in this porous sheet, the compressive elastic modulus at 5% strain in the thickness direction can be controlled to at least 0.5 MPa but not more than 2 MPa by appropriately adjusting, for example, the number of layers of the sheet materials. The heat insulating properties of heat insulators that are generally used tend to decrease because of compressive deformation. However, a porous sheet to be produced by the method of this embodiment can achieve high compressive elastic modulus as mentioned above, so that deformation due to compression is small. As a result, it is possible to avoid a decrease in heat insulating properties to be caused by compressive deformation. Furthermore, such a porous sheet has a restoring force against compression, and therefore has a thermal conductivity that is difficult to change, even after a compressive force is applied in the thickness direction. As a heat insulator capable of preventing a decrease in heat insulating properties due to compression, JP 2709371 B2 (Patent Literature 1) proposes a fiber reinforced plastic heat insulator produced by alternately stacking a woven fabric or nonwoven fabric impregnated with a matrix resin and a woven fabric or nonwoven fabric not impregnated with a matrix resin and pressing them, for example. However, this heat insulator involves problems, such as complicated production process and low flexibility, in addition to the lack of electrical conductivity. In contrast, the porous sheet to be produced according to the method of this embodiment has a simple and convenient production process because it can be produced by stacking sheet materials that contain PTFE and carbon particles, and rolling them. Further, this porous sheet has high flexibility, and therefore has high bending strength.

The porous sheet of this embodiment further has self-bonding adhesiveness. Therefore, it is possible to avoid the problem of the sheet shifting from a predetermined position when being placed at the predetermined position in equipment or the like to serve as a heat insulating sheet, for example.

As described above, the porous sheet produced by the method of this embodiment is formed by stacking sheet materials that contain PTFE and carbon particles, and therefore has a thermal conductivity, a volume resistivity and a compressive elastic modulus in the thickness direction that satisfy the above-mentioned range.

The porous sheet to be obtained according to this embodiment can be used as a heat insulating sheet. This porous sheet has good heat insulating properties and good electrical conductivity as mentioned above. Therefore, the heat insulating sheet of this embodiment produced using this porous sheet has good heat insulating properties and is capable of preventing generation of static electricity. Furthermore, the heat insulating sheet of this embodiment also has high compressive elastic modulus. Therefore, even if a compressive force is applied in the thickness direction, the heat insulating properties are unlikely to decrease.

EXAMPLES

Next, the porous sheet and the method for producing the porous sheet of the present invention are described specifically with reference to examples.

Example 1

15 parts by mass of PTFE fine powder (product name: "F104", manufactured by DAIKIN INDUSTRIES, LTD), 85 parts by mass of acetylene black (product name: "DENKA BLACK (powdered product)", manufactured by DENKI KAGAKU KOGYO KABUSHIKI KAISHA), 140 parts by mass of saturated hydrocarbon (product name: "NS clean 220", manufactured by Japan Energy Corporation) to serve as a forming aid were mixed in a blender. The mixing conditions were set to: rotation rate: 100 rpm; temperature: 20° C.; and mixing time: 2 minutes. The mixture was compressed at a pressure of 0.3 MPa to form a preform. Next, this preform was extruded at approximately 10 MPa to form a 15 mm-diameter round bar. Further, the round bar was rolled by passing though between a pair of metal rollers (surface temperature: 40° C.). Thus, a base sheet (sheet material) with a thickness of 5 mm and a width of 25 mm was obtained.

First, two base sheets were stacked, and the stacked product was rolled, so that a laminated sheet (the first laminated sheet) was produced. Next, two first laminated sheets thus obtained were prepared as a sheet material. These two first laminated sheets were stacked over each other and layered, and the stacked product was rolled. Thus, a new laminated sheet (the second laminated sheet) was produced. Next, two second laminated sheets thus obtained were prepared as a sheet material. These two second laminated sheets were stacked over each other and layered, and the stacked product was rolled. Thus, a new laminated sheet (the third laminated sheet) was produced. In this way, by repeating the steps of stacking the obtained laminated sheets as a sheet material over each other and rolling them 8 times, a sheet having 256 layers was produced. In this example, the rolling step of step (II) in the present invention was repeated 8 times. In each rolling step, the rolling direction was shifted by 90 degrees from the rolling direction of the previous rolling step. Such configurations that the rolling direction is shifted when repeating the rolling step and the angle of the shift is 90 degrees are not intended to limit the principles of the present invention. The finally obtained sheet had a thickness of 1 mm, a width of 250 mm, and a length of 2 m. Subsequently, this sheet was heated to 150° C. so that the forming aid was removed.

The thermal conductivity, the volume resistivity and the compressive elastic modulus were measured for the porous sheet of Example 1 as produced above. The measurement methods were as follows. Further, Table 1 indicates the measurement results.

<Measurement of Thermal Conductivity>

The thermal conductivity in the thickness direction was measured using a thermal conductivity meter (product name: "QTM-500", manufactured by Kyoto Electronics Manufacturing Co., Ltd.) based on the hot wire method.

<Measurement of Volume Resistivity>

The volume resistivity was measured using the four-terminal method. A current of 100 mA was applied to the porous sheet in the thickness direction, and the voltage was measured. Thus, the volume resistivity was determined. An electrode probe was brought into contact with the porous sheet with a pressure of 0.2 MPa, when the measurement was carried out.

<Measurement of Compressive Elastic Modulus>

Using a Tensilon universal testing machine (manufactured by A&D Company, Limited), the porous sheet was compressed in the thickness direction at a speed of 0.5 mm/min, and thus the displacement and stress were measured. The compressive elastic modulus (E) was calculated taking a stress load of 20 kPa as the displacement of 0 and applying the measured value of the stress (δ) at 5% strain to the following formula:

$$E = \delta/0.05.$$

Example 2

30 parts by mass of PTFE fine powder (product name: "F104", manufactured by DAIKIN INDUSTRIES, LTD), 70 parts by mass of acetylene black (product name: "DENKA BLACK (powdered product)", manufactured by DENKI KAGAKU KOGYO KABUSHIKI KAISHA), 100 parts by mass of saturated hydrocarbon (product name: "NS clean 220", manufactured by Japan Energy Corporation) to serve as a forming aid were mixed in a blender. Except for that, the porous sheet of Example 2 was produced in the same manner as in Example 1.

The thermal conductivity, the volume resistivity and the compressive elastic modulus were measured for the porous sheet of Example 2, in the same manner as in Example 1. Table 1 indicates the measurement results.

Comparative Example 1

15 parts by mass of PTFE fine powder (product name: "F104", manufactured by DAIKIN INDUSTRIES, LTD), 85 parts by mass of acetylene black (product name: "DENKA BLACK (powdered product)", manufactured by DENKI KAGAKU KOGYO KABUSHIKI KAISHA), 140 parts by mass of saturated hydrocarbon (product name: "NS clean 220", manufactured by Japan Energy Corporation) to serve as a forming aid were mixed in a blender. The mixing conditions were set to: rotation rate: 100 rpm; temperature: 20° C.; and mixing time: 2 minutes. The mixture was compressed at a pressure of 0.3 MPa to form a preform. Next, this preform was extruded at approximately 10 MPa to form a plate with a thickness of 5 mm and a width of 30 mm. Further, the plate product was rolled in the extrusion direction by passing though between a pair of metal rollers (surface temperature: 40° C.). Thus, a sheet with a thickness of 1 mm and a width of 50 mm was obtained. Subsequently, this sheet was heated to 150° C. so that the forming aid was removed.

The thermal conductivity, the volume resistivity and the compressive elastic modulus were measured for the obtained porous sheet of Comparative Example 1, in the same manner as in Example 1. Table 1 indicates the measurement results.

TABLE 1

|  | Thermal conductivity (W/mK) | Volume resistivity (Ω · cm) | Compressive elastic modulus (Mpa) |
| --- | --- | --- | --- |
| Example 1 | 0.055 | 0.8 | 1.5 |
| Example 2 | 0.08 | 1.5 | 0.5 |
| Comparative Example 1 | 0.12 | 0.5 | 0.3 |

The porous sheet of Example 1 and the porous sheet of Comparative Example 1, which had been produced at the same material ratio as the porous sheet of Example 1 (PTFE: 15 parts by mass, carbon particles: 85 parts by mass, forming aid: 140 parts by mass), were compared to each other. The porous sheet of Comparative Example 1 that does not have a multilayer structure showed high thermal conductivity and thus insufficient heat insulating properties, though its volume resistivity was low (which means high electrical conductivity). In contrast, the porous sheet of Example 1 achieved low volume resistivity (high electrical conductivity) and low thermal conductivity (good heat insulating properties) simultaneously. Further, the porous sheet of Example 2 produced in the same manner as in Example 1, though the material ratio thereof was different from that of Example 1, achieved low volume resistivity and low thermal conductivity simultaneously, as was the case of Example 1. Further, the porous sheets of Examples 1 and 2 each had higher compressive elastic modulus than the porous sheet of Comparative Example 1.

The above results demonstrated that the porous sheet produced by the production method of the present invention prevented generation of static electricity due to its high electrical conductivity, and had sufficient heat insulating properties.

INDUSTRIAL APPLICABILITY

The porous sheet according to the present invention has low thermal conductivity and high electrical conductivity. Therefore, the porous sheet of the present invention can be used suitably for a precision instrument or the like as a heat insulator that is capable of preventing generation of static electricity. Further, the porous sheet according to the present invention can be used also as a material that prevents generation of noise caused by static electricity or dust proof material.

The invention claimed is:

1. A method for producing a porous sheet comprising steps of:
    (I) preparing a plurality of sheet materials, wherein each of the sheet materials comprises polytetrafluoroethylene, carbon particles, and a forming aid; and
    (II) stacking the plurality of the sheet materials over one another and rolling the stacked sheet materials,
    wherein the each of the sheet materials is a base sheet or a laminated sheet of the base sheets,
    the forming aid consists of one or more saturated hydrocarbons,
    an amount of the carbon particles in the sheet materials is from 60 to 90 wt % relative to a total amount of the polytetrafluoroethylene and the carbon particles,
    the step (I) and the step (II) are repeated alternately, and the porous sheet has a porosity from 70 to 80 vol %,
    and wherein the base sheet is prepared by a method comprising steps of:
    mixing the polytetrafluoroethylene, the carbon particles, and the forming aid under a condition in which forming a fibrous polytetrafluoroethylene is suppressed so as to form a mixture; and
    then forming the base sheet of the mixture in a sheet form.

2. The method for producing a porous sheet according to claim 1,
    wherein a number of constituent layers of the sheet materials in the porous sheet is from 100 to 800 layers when the number of the constituent layers in the porous sheet is expressed as a total number of the base sheets included in the porous sheet.

3. The method for producing a porous sheet according to claim 2,
    wherein the number of the constituent layers in the porous sheet is from 200 to 600 layers.

4. The method for producing a porous sheet according to claim 1,
    wherein a rolling direction of the stacked sheet materials is changed while the step (II) is repeated.

5. The method for producing a porous sheet according to claim 1,
    wherein the porous sheet has a thermal conductivity in a thickness direction of at least 0.05 W/mK but no more than 0.1 W/mK, and a volume resistivity in the thickness direction of at least 0.5 Ω·cm but no more than 2 Ω·cm.

6. The method for producing a porous sheet according to claim 1,
    wherein the porous sheet has a compressive elastic modulus of at least 0.5 MPa but no more than 2 MPa measured at 5% strain in a thickness direction.

* * * * *